(12) United States Patent
Fan

(10) Patent No.: US 12,464,403 B2
(45) Date of Patent: Nov. 4, 2025

(54) DATA TRANSMISSION METHOD AND APPARATUS

(71) Applicant: HUAWEI TECHNOLOGIES CO., LTD., Guangdong (CN)

(72) Inventor: Qiang Fan, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 18/080,739

(22) Filed: Dec. 13, 2022

(65) Prior Publication Data

US 2023/0116578 A1    Apr. 13, 2023

Related U.S. Application Data

(63) Continuation of application No. PCT/CN2021/099898, filed on Jun. 12, 2021.

(30) Foreign Application Priority Data

Jun. 29, 2020   (CN) .......................... 202010606803.7

(51) Int. Cl.
*H04W 28/02* (2009.01)

(52) U.S. Cl.
CPC ... *H04W 28/0268* (2013.01); *H04W 28/0263* (2013.01)

(58) Field of Classification Search
CPC ....... H04W 12/69; H04W 4/24; H04W 8/183; H04W 12/35; H04W 28/02; H04W 28/0263; H04W 28/0268; H04W 24/02; H04W 28/24; H04W 76/10; H04W 88/14; H04B 1/0475; H04B 1/525; H04B 1/04; H03F 1/3288; H03F 3/19; H03F 3/245

USPC .......................................................... 370/310
See application file for complete search history.

(56) References Cited

U.S. PATENT DOCUMENTS

| | | | |
|---|---|---|---|
| 2018/0139651 A1* | 5/2018 | Kim | H04L 5/00 |
| 2018/0176340 A1* | 6/2018 | Huang | H04L 61/2596 |
| 2018/0249364 A1* | 8/2018 | Chen | H04W 76/22 |
| 2018/0324632 A1* | 11/2018 | Cho | H04W 28/0268 |

(Continued)

FOREIGN PATENT DOCUMENTS

| | | |
|---|---|---|
| CN | 109451534 A | 3/2019 |
| CN | 110267312 A | 9/2019 |

(Continued)

OTHER PUBLICATIONS

Chandramouli Devaki et al: "Sessions, User Plane, and QoS Management" In: "5G for the Connected World", Mar. 8, 2019, Wiley, XP093095796, ISBN: 978-1-119-24711-1, pp. 283-310.

(Continued)

*Primary Examiner* — Nathan S Taylor

(57) ABSTRACT

Method and apparatus provide for receipt by a communication apparatus of first indication information from a second communication apparatus indicating whether a first service of a terminal device is a service of a first type. The communication apparatus obtains characteristic information of the first service based on the first indication information, determines a mapping relationship between a packet filter set of the first service and a quality of service QoS flow based on the characteristic information, and sends the mapping relationship to a third communication apparatus.

17 Claims, 5 Drawing Sheets

(56) References Cited

U.S. PATENT DOCUMENTS

| | | | | |
|---|---|---|---|---|
| 2018/0359802 | A1* | 12/2018 | Cho | H04L 69/22 |
| 2019/0116517 | A1* | 4/2019 | Liu | H04W 8/24 |
| 2020/0059992 | A1* | 2/2020 | Skog | H04L 45/38 |
| 2020/0112874 | A1* | 4/2020 | Jheng | H04W 28/0268 |
| 2020/0228936 | A1* | 7/2020 | Talebi Fard | H04W 4/08 |
| 2020/0267785 | A1* | 8/2020 | Talebi Fard | H04L 45/04 |
| 2020/0374352 | A1* | 11/2020 | Ge | H04L 67/146 |
| 2021/0105657 | A1* | 4/2021 | Hu | H04W 28/0268 |
| 2021/0219357 | A1* | 7/2021 | Talebi Fard | H04L 67/14 |
| 2021/0274329 | A1* | 9/2021 | Ying | H04W 4/40 |
| 2021/0399989 | A1* | 12/2021 | Wang | H04L 47/2491 |
| 2022/0052956 | A1* | 2/2022 | Hu | H04B 17/364 |
| 2022/0182896 | A1* | 6/2022 | Talebi Fard | H04W 36/0085 |
| 2023/0102218 | A1* | 3/2023 | Xu | H04W 76/11 |
| | | | | 370/235 |

FOREIGN PATENT DOCUMENTS

| | | |
|---|---|---|
| CN | 111200798 A | 5/2020 |
| JP | 2022537235 A | 8/2022 |
| WO | 2019072952 A1 | 4/2019 |
| WO | 2020253456 A1 | 12/2020 |

OTHER PUBLICATIONS

3GPP, "Technical Specification Group Services and System Aspects System architecture for the 5G System (5GS) Stage 2 (Release 16)", 3GPP TS 23.501 V16.4.0, Mar. 31, 2020, total 430 pages.

* cited by examiner

DATA TRANSMISSION METHOD AND APPARATUS

CROSS-REFERENCE TO RELATED APPLICATIONS

This application is a continuation of International Application No. PCT/CN2021/099898, filed on Jun. 12, 2021, which claims priority to Chinese Patent Application No. 202010606803.7, filed on Jun. 29, 2020. The disclosures of the aforementioned applications are hereby incorporated by reference in their entireties.

TECHNICAL FIELD

Embodiments of this disclosure relate to the wireless communication field, and in particular, to a data transmission method and an apparatus.

BACKGROUND

In a mobile communication network, an operator can provide more diversified services such as voice, data, and video services for a user. Because different services have different requirements on a delay, bandwidth, and the like, a quality of service (QoS) solution is introduced to implement differentiated processing of various services, provide a guarantee for a high-speed data service, and enhance user network experience. An objective of the QoS solution is to provide network services with different quality of service guarantees to satisfy different service requirements. Especially, when network congestion occurs, service quality of a high-priority user or service can be preferentially guaranteed.

When an uplink service flow is generated, a terminal device analyzes an uplink data packet of the uplink service flow to obtain a 5-tuple of the data packet, determines, based on a mapping relationship between a 5-tuple and a quality of service flow identifier (QFI), a QFI corresponding to the 5-tuple, and may include the QFI corresponding to the 5-tuple in an encapsulation header of the data packet so that the uplink service flow can be mapped to a QoS flow. When a downlink service flow is generated, a user plane core network element may map the downlink service flow to a QoS flow in a similar manner as that on a side of the terminal device.

SUMMARY

This disclosure provides a data transmission method and an apparatus, to implement distinguishing processing on data and satisfy different requirements of a user.

According to a first aspect, a data transmission method is performed by a first communication apparatus. The first communication apparatus receives first indication information from a second communication apparatus, where the first indication information indicates whether a first service of a terminal device is a service of a first type, and obtains characteristic information of the first service based on the first indication information. The first communication apparatus determines a mapping relationship between a packet filter set of the first service and a quality of service QoS flow based on the characteristic information of the first service, and sends the mapping relationship between a packet filter set of the first service and a QoS flow to a third communication apparatus.

By implementing the method described in the first aspect, the first communication apparatus obtains the characteristic information of the first service of the terminal device based on the received first indication information, and the first communication apparatus determines the mapping relationship between a packet filter set of the first service and a QoS flow based on the characteristic information, so that the first communication apparatus considers the characteristic information of the first service when determining the mapping relationship between a packet filter set of a data packet of the first service and a QoS flow. Therefore, a quality of service requirement of the data packet can be more comprehensively considered, and in this way, distinguishing processing can be performed on data more effectively, so that resource utilization is improved while different transmission requirements are met.

In a possible implementation of the first aspect, the first communication apparatus obtains characteristic information of the first service based on the first indication information includes: when the first indication information indicates that the first service is the service of the first type, the first communication apparatus obtains the characteristic information of the first service.

In a possible implementation of the first aspect, the characteristic information of the first service includes a mapping relationship between a characteristic parameter and a QoS parameter.

In a possible implementation of the first aspect, the packet filter set includes the characteristic parameter, and the mapping relationship between a packet filter set and a QoS flow includes a mapping relationship between the characteristic parameter and a quality of service flow identifier QFI.

In a possible implementation of the first aspect, that the first communication apparatus obtains characteristic information of the first service includes: the first communication apparatus sends request information to a fourth communication apparatus that is configured to use the request information to request the characteristic information of the first service. The first communication apparatus receives second indication information from the fourth communication apparatus, where the second indication information includes the characteristic information of the first service.

In a possible implementation of the first aspect, the first communication apparatus sends the mapping relationship between a packet filter set of the first service and a QoS flow to the terminal device.

In a possible implementation of the first aspect, the first communication apparatus sends a QoS profile to an access network device based on the mapping relationship between a packet filter set of the first service and a QoS flow, where the QoS profile includes a mapping relationship between a characteristic parameter, a QFI, and a QoS parameter.

In a possible implementation of the first aspect, the first communication apparatus is a session management function (SMF) entity.

In a possible implementation of the first aspect, the second communication apparatus is an access and mobility management function (AMF) entity.

In a possible implementation of the first aspect, the third communication apparatus is a user plane function (UPF) entity.

In a possible implementation of the first aspect, the fourth communication apparatus is a unified data management (UDM) entity, a policy control function (PCF) entity, a network exposure function (NEF) entity, or a unified data repository (UDR) entity.

According to a second aspect, a data transmission method is performed by a first communication apparatus. The first communication apparatus receives first indication information from a second communication apparatus, where the first indication information indicates whether a first service of a terminal device is a service of a first type. The first communication apparatus obtains characteristic information of the first service based on the first indication information. The first communication apparatus sends the characteristic information of the first service to an access network device.

By implementing the method described in the second aspect, the first communication apparatus obtains the characteristic information of the first service of the terminal device based on the received first indication information and sends the characteristic information of the first service to the access network device. In this way, when receiving a downlink data packet of the first service, the access network device maps the downlink data packet to a corresponding DRB (data radio bearer) based on the characteristic information of the first service. Therefore, a quality of service requirement of the data packet is more comprehensively considered, and in this way, distinguishing processing can be performed on data more effectively, so that resource utilization is improved while different transmission requirements are met.

In a possible implementation of the second aspect, the first communication apparatus obtains characteristic information of the first service based on the first indication information includes: when the first indication information indicates that the first service is the service of the first type, the first communication apparatus obtains the characteristic information of the first service.

In a possible implementation of the second aspect, the characteristic information of the first service includes a mapping relationship between a characteristic parameter and a QoS parameter.

In a possible implementation of the second aspect, the first communication apparatus obtains characteristic information of the first service specifically includes: The first communication apparatus sends request information to a fourth communication apparatus, where the request information is used to request the characteristic information of the first service; and the first communication apparatus receives second indication information from the fourth communication apparatus, where the second indication information includes the characteristic information of the first service.

In a possible implementation of the second aspect, the first communication apparatus sends a mapping relationship between a packet filter set of the first service and a QoS flow to a third communication apparatus.

In a possible implementation of the second aspect, the first communication apparatus sends the mapping relationship between a packet filter set of the first service and a QoS flow to the terminal device.

In a possible implementation of the second aspect, the first communication apparatus is a session management function (SMF) entity.

In a possible implementation of the second aspect, the second communication apparatus is an access and mobility management function (AMF) entity.

In a possible implementation of the second aspect, the third communication apparatus is a user plane function (UPF) entity.

In a possible implementation of the second aspect, the fourth communication apparatus is a unified data management (UDM) entity, a policy control function (PCF) entity, a network exposure function (NEF) entity, or a unified data repository (UDR) entity.

According to a third aspect, a data transmission method is performed by an access network device or a module in the access network device. Herein, an example in which the access network device is an execution body is used for description. The access network device receives characteristic information of a first service from a first communication apparatus. The access network device determines a mapping relationship between a QoS flow, a characteristic parameter, and a DRB (data radio bearer) based on the characteristic information of the first service.

By implementing the method described in the third aspect, when receiving a downlink data packet of the first service, the access network device maps the downlink data packet to a corresponding DRB based on the characteristic information of the first service, and sends the downlink data packet to a terminal device through the DRB. Therefore, a quality of service requirement of the data packet is more comprehensively considered, and in this way, distinguishing processing can be performed on data more effectively so that resource utilization is improved while different transmission requirements are met.

In a possible implementation of the third aspect, the characteristic information of the first service includes a mapping relationship between a characteristic parameter and a QoS parameter.

In a possible implementation of the third aspect, the access network device receives a GTP-U data packet from a third communication apparatus, where the GTP-U data packet includes a data packet and indication information, and the indication information indicates the characteristic parameter, and determines, based on a characteristic parameter in the GTP-U data packet and the mapping relationship between a QoS flow, a characteristic parameter, and a DRB, a DRB to which the GTP-U data packet is mapped.

In a possible implementation of the third aspect, the access network device sends the mapping relationship between a QoS flow, a characteristic parameter, and a DRB to the terminal device.

According to a fourth aspect, a communication apparatus includes a functional module configured to implement the method according to any one of the first aspect, the possible implementations of the first aspect, the second aspect, or the possible implementations of the second aspect.

According to a fifth aspect, a communication apparatus includes a functional module configured to implement the method according to any one of the third aspect or the possible implementations of the third aspect.

According to a sixth aspect, a communication apparatus includes a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the method according to any one of the first aspect, the possible implementations of the first aspect, the second aspect, or the possible implementations of the second aspect by using a logic circuit or executing code instructions.

According to a seventh aspect, a communication apparatus includes a processor and an interface circuit. The interface circuit is configured to receive a signal from another communication apparatus other than the communication apparatus and transmit the signal to the processor, or send a signal from the processor to another communication apparatus other than the communication apparatus. The processor is configured to implement the method according to any one of the third aspect or the possible implementations of the third aspect by using a logic circuit or executing code instructions.

According to an eighth aspect, a computer-readable storage medium stores a computer program or instructions. When the computer program or the instructions are executed, the method according to any one of the first aspect, the possible implementations of the first aspect, the second aspect, or the possible implementations of the second aspect is implemented.

According to a ninth aspect, a computer-readable storage medium stores a computer program or instructions. When the computer program or the instructions are executed, the method according to any one of the third aspect or the possible implementations of the third aspect is implemented.

According to a tenth aspect, a computer program product including instructions is provided. When the instructions are run, the method according to any one of the first aspect, the possible implementations of the first aspect, the second aspect, or the possible implementations of the second aspect is implemented.

According to an eleventh aspect, a computer program product including instructions is provided. When the instructions are run, the method according to any one of the third aspect or the possible implementations of the third aspect is implemented.

According to a twelfth aspect, a computer program is provided. The computer program includes code or instructions. When the code or the instructions are run, the method according to any one of the first aspect, the possible implementations of the first aspect, the second aspect, or the possible implementations of the second aspect is implemented.

According to a thirteenth aspect, a computer program is provided. The computer program includes code or instructions. When the code or the instructions are run, the method according to any one of the third aspect or the possible implementations of the third aspect is implemented.

According to a fourteenth aspect, a chip system is provided. The chip system includes a processor, may further include a memory, and is configured to implement at least one method according to any one of the first aspect, the possible implementations of the first aspect, the second aspect, the possible implementations of the second aspect, the third aspect, or the possible implementations of the third aspect. The chip system may include a chip, or may include a chip and another discrete component.

According to a fifteenth aspect, a communication system is provided that includes the apparatus according to the fourth aspect or the sixth aspect and the apparatus according to the fifth aspect or the seventh aspect.

DESCRIPTION OF EMBODIMENTS

Technical solutions provided in embodiments of this disclosure may be applied to various communication systems, for example, a long term evolution (LTE) system, a 5th generation (5G) mobile communication system, a Wi-Fi system, a future communication system, a system integrating a plurality of communication systems, or the like. This is not limited in embodiments of this application. 5G may also be referred to as new radio (NR).

The technical solutions provided in embodiments of this disclosure may be applied to various communication scenarios, for example, may be applied to one or more of the following communication scenarios: enhanced mobile broadband (eMBB), ultra-reliable low-latency communication (URLLC), machine type communication (MTC), massive machine type communication (mMTC), device-to-device (D2D), vehicle to everything (V2X), vehicle to vehicle (V2V), internet of things (IoT), and the like.

In embodiments of this disclosure, "/" may represent an "or" relationship between associated objects. For example, A/B may represent A or B. The term "and/or" may be used to indicate that there are three relationships between the associated objects. For example, A and/or B may represent the following three cases: Only A exists, both A and B exist, and only B exists. A and B may be singular or plural. In embodiments of this application, terms such as "first" or "second" may be used to distinguish between technical features with a same or similar function. The terms such as "first" or "second" do not limit a quantity and an execution sequence, and the terms such as "first" or "second" do not indicate a definite difference. In embodiments of this application, terms such as "example" or "for example" are used to represent giving an example, an illustration, or a description. Any embodiment or design scheme described with "example" or "for example" should not be interpreted as being more preferred or having more advantages than another embodiment or design scheme. Instead, use of the terms such as "example" or "for example" is intended to present a related concept in a specific manner for ease of understanding.

Figure 1:
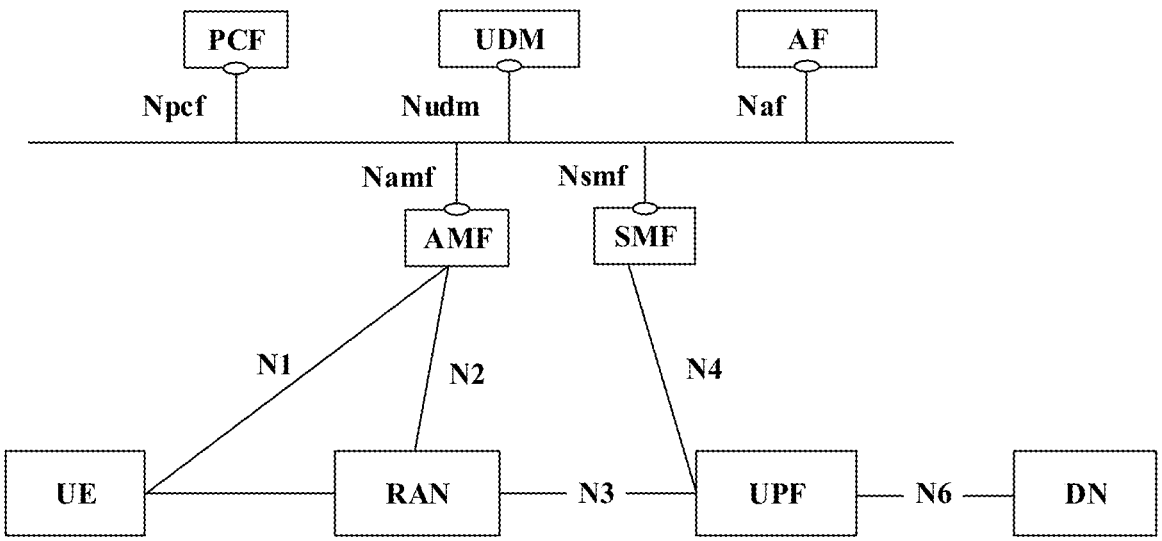
FIG. 1 is a schematic diagram of a network architecture to which an embodiment of this disclosure is applicable.

FIG. 1 is a schematic diagram of a network architecture to which an embodiment of this disclosure is applicable. As shown in FIG. 1, a terminal device may access a wireless network, to access a service of an external network (for example, a data network (DN)) through the wireless network, or communicate with another device through the wireless network, for example, communicate with another terminal device. The wireless network includes a radio access network (RAN) and a core network (CN). The RAN is used to connect the terminal device to the wireless network, and the CN is used to manage the terminal device and provide a gateway for communication with the DN.

The following separately describes in detail the terminal device, the RAN, the CN, and the DN in FIG. 1.

1. Terminal Device

The terminal device in embodiments of this disclosure may also be referred to as a terminal, user equipment (UE), a mobile station, a mobile terminal, or the like. The terminal device may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. A specific technology and a specific device form that are used by the terminal device are not limited in embodiments of this disclosure. In embodiments of this disclosure, an apparatus configured to implement a function of the terminal device may be a terminal device, or may be an apparatus, for example, a chip system, that can support the terminal device in implementing the function. The apparatus may be deployed in the terminal device, or may be used together with the terminal device. In embodiments, the chip system may include a chip, or may include a chip and another discrete component. In the technical solutions provided in embodiments of this disclosure, the technical solutions are described by using an example in which the apparatus configured to implement the function of the terminal device is the terminal device.

2. RAN

The RAN may include one or more RAN devices, and an interface between the RAN device and the terminal device may be a Uu interface (or referred to as an air interface). Certainly, in future communication, a name of the interface may still be used, or may be replaced with another name. This is not limited in this disclosure.

The RAN device is an access device used by the terminal device to access a mobile communication system in a wireless manner, and may be a base station, an evolved NodeB (evolved NodeB, eNodeB), a transmission reception point (TRP), a next generation NodeB (gNB) in the 5G mobile communication system, a base station in a future mobile communication system, an access node in a Wi-Fi system, or the like. The RAN device may include a central unit (CU), or a distributed unit (DU), or include the CU and the DU. In the technical solutions provided in embodiments of this application, the technical solutions provided in embodiments of this disclosure are described by using an example in which an apparatus configured to implement a function of the RAN device is the RAN device.

Communication between the RAN device and the terminal device complies with a specific protocol layer structure. For example, a control plane protocol layer structure may include functions of protocol layers such as an RRC layer, a packet data convergence protocol (PDCP) layer, a radio link control (RLC) layer, a media access control (MAC) layer, and a physical layer, and a user plane protocol layer structure may include functions of protocol layers such as the PDCP layer, the RLC layer, the MAC layer, and the physical layer. In a possible implementation, a service data adaptation protocol (SDAP) layer may be further included above the PDCP layer.

Figure 2:
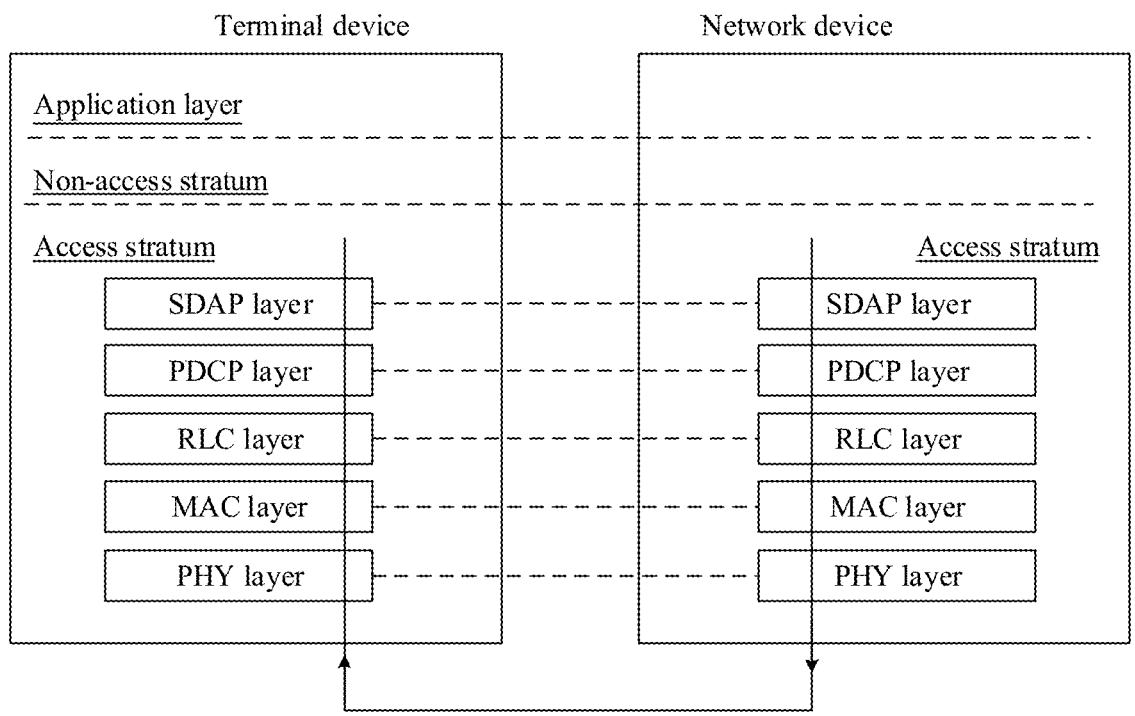
FIG. 2 is a diagram of an example of a protocol layer structure between a terminal device and an access network device according to an embodiment of this disclosure.

Data transmission between the RAN device and the terminal device is used as an example. The data transmission needs to go through a user plane protocol layer such as the SDAP layer, the PDCP layer, the RLC layer, the MAC layer, and the physical layer. The SDAP layer, the PDCP layer, the RLC layer, the MAC layer, and the physical layer are also collectively referred to as an access stratum. Because a data transmission direction includes sending or receiving, each layer is further divided into a sending part and a receiving part. Downlink data transmission is used as an example. FIG. 2 is a schematic diagram of downlink data transmission between layers. In FIG. 2, a downward arrow represents data sending, and an upward arrow represents data receiving. After obtaining data from an upper layer, the PDCP layer transmits the data to the RLC layer and the MAC layer, the MAC layer generates a transport block, and then wireless transmission is performed through the physical layer. The data is correspondingly encapsulated at each layer. Data received by a layer from an upper layer of the layer is considered as a service data unit (SDU) of the layer. After being encapsulated at the layer, the data becomes a protocol data unit (PDU), and is then transferred to a next layer. For example, data received by the PDCP layer from an upper layer is referred to as a PDCP SDU, and data sent by the PDCP layer to a lower layer is referred to as a PDCP PDU. Data received by the RLC layer from an upper layer is referred to as an RLC SDU, and data sent by the RLC layer to a lower layer is referred to as an RLC PDU. In a protocol, layers correspond to each other in a form of channels. The RLC layer corresponds to the MAC layer through a logical channel (LCH), the MAC layer corresponds to the physical layer through a transport channel, and the physical layer corresponds to a physical layer at another end through a physical channel. The physical channel is below the physical layer.

For example, it can be further learned from FIG. 2 that, the terminal device further has an application layer and a non-access stratum. The application layer may be configured to provide a service for an application program installed on the terminal device. For example, downlink data received by the terminal device may be sequentially transmitted from the physical layer to the application layer, and then is provided by the application layer for the application program. For another example, the application layer may obtain data generated by the application program, sequentially transmit the data to the physical layer, and then the data is sent to another communication apparatus. The non-access stratum may be configured to forward user data. For example, the non-access stratum forwards uplink data received from the application layer to the SDAP layer, or forwards downlink data received from the SDAP layer to the application layer.

3. CN

The CN may include one or more CN devices. Using a 5G communication system as an example, the CN may include an access and mobility management function (AMF) network element, a session management function (SMF) network element, a user plane function (UPF) network element, a policy control function (PCF) network element, a unified data management (UDM) network element, an application function (AF) network element, a network exposure function (NEF) network element, a unified data repository (UDR) network element, and the like.

The AMF network element is a control plane network element provided by an operator network, and is responsible for access control and mobility management for accessing the operator network by the terminal device, for example, including functions such as mobility status management, allocation of a temporary user identity, and user authentication and authorization.

The SMF network element is a control plane network element provided by an operator network and is responsible for managing a PDU session of the terminal device. The PDU session is a channel used to transmit a PDU. The terminal device and the DN need to transmit a PDU with each other through the PDU session. The SMF network element is responsible for establishment, maintenance, deletion, and the like of the PDU session. The SMF network element includes functions related to a session, for example, session management (for example, session establishment, modification, and release, including tunnel maintenance between the UPF and the RAN), selection and control of the UPF network element, service and session continuity (SSC) mode selection, and roaming.

The UPF network element is a gateway provided by an operator, and is a gateway for communication between an operator network and the DN. The UPF network element includes user plane-related functions such as data packet routing and transmission, packet detection, service usage reporting, quality of service (QoS) processing, lawful interception, uplink packet detection, and downlink data packet storage.

The PCF network element is a control plane function provided by an operator, and is configured to provide a PDU session policy for the SMF network element. The policy may include a charging-related policy, a QoS-related policy, an authorization-related policy, and the like.

The UDM network element is a control plane network element provided by an operator, and is responsible for storing information such as a subscriber permanent identifier (SUPI), a security context, and subscription data of a subscriber in an operator network.

The AF network element is a function network element configured to provide various business services and can interact with a core network through another network element and interact with a policy management framework to perform policy management.

In addition, the CN may further include another possible network element, for example, the network exposure function (NEF) network element or the unified data repository (UDR) network element. The NEF network element is configured to provide a framework, authentication, and an interface that are related to network capability exposure and transmit information between a 5G system network function and another network function. The UDR network element is mainly configured to store subscription data, policy data, structured data for exposure, and application data that are related to a subscriber.

In embodiments of this application, the CN device may be an AMF entity, an SMF entity, a UPF entity, a PCF entity, an AF entity, an NEF entity, a UDR entity, or the like. In the network architecture shown in FIG. 1, communication between the RAN device and the UPF entity may comply with a specific protocol, for example, a GTP-U protocol. The GTP-U protocol is one protocol of a general packet radio service (GPRS) tunneling protocol (GTP).

4. DN

The DN may also be referred to as a packet data network (PDN), and is a network located outside an operator network. The operator network may access a plurality of DNs, and a plurality of services may be deployed on the DNs to provide a service such as data and/or a voice for the terminal device. In FIG. 1, Npcf, Nudm, Naf, Namf, Nsmf, N1, N2, N3, N4, and N6 are interface sequence numbers. For meanings of these interface sequence numbers, refer to related standard protocols. This is not limited herein.

Figure 3:
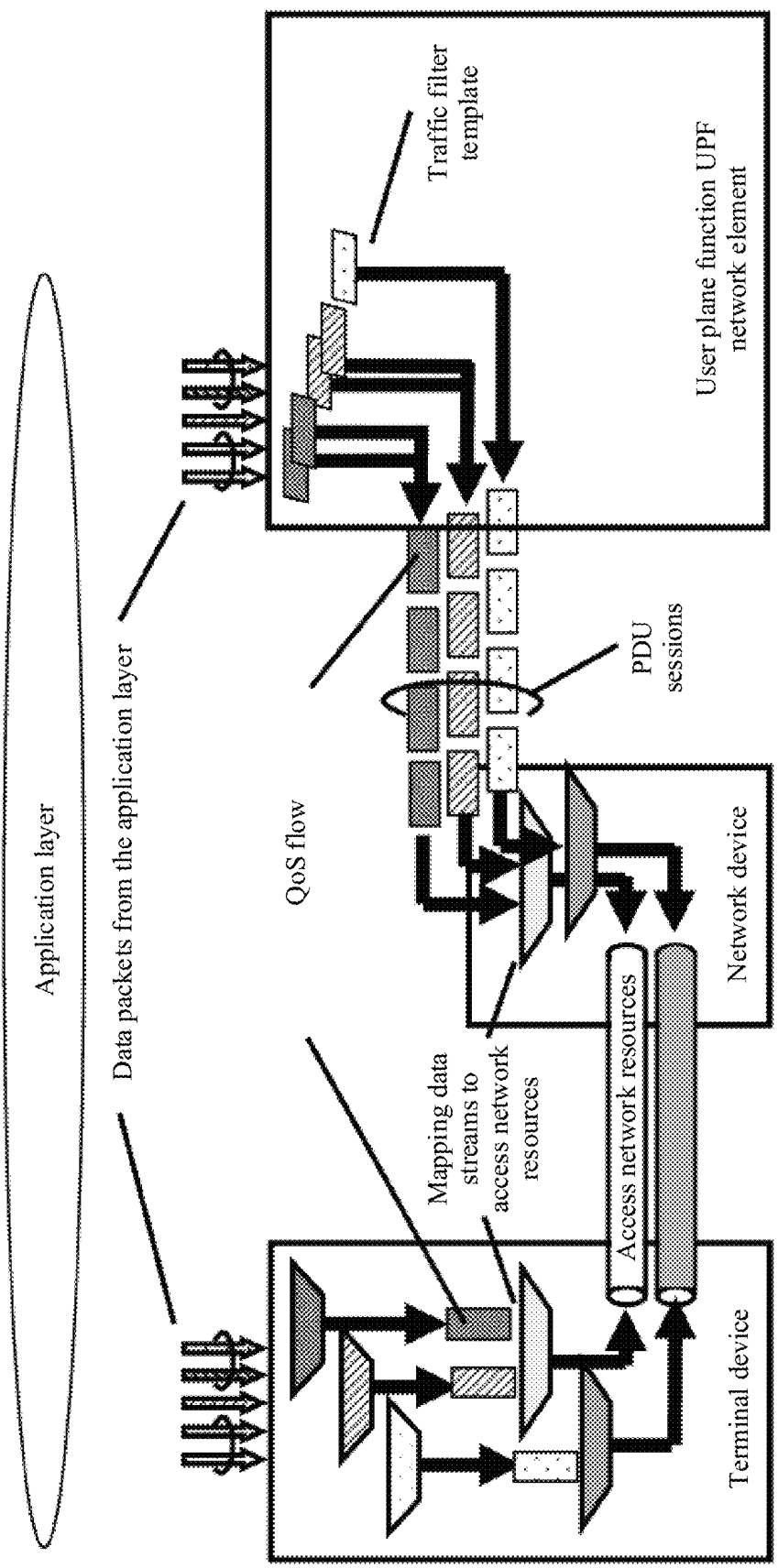
FIG. 3 is a schematic diagram of a QoS model according to an embodiment of this disclosure.

When the network architecture shown in FIG. 1 is applicable to a 5G communication system (which may be referred to as 5GS for short), data transmission between different communication apparatuses described above may be implemented based on a QoS model in the 5GS. FIG. 3 is a schematic diagram of a QoS model.

As shown in FIG. 3, in a downlink direction, data packets entering the 5GS are distinguished at a UPF entity. For example, the UPF entity distinguishes, based on a packet filter set in a downlink packet detection rule (PDR), downlink data packets into different QoS flows. All data packets in a same QoS flow are marked with a same QFI. The UPF entity transmits the data packets to the RAN device through the N3 interface. The RAN device maps a QoS flow to a data radio bearer (DRB) to transmit downlink data on a Uu interface. In an uplink direction, after generating data packets, an application layer of the terminal device distinguishes, based on a packet filter set in a QoS rule (rule) configured by an SMF entity, uplink data packets into different QoS flows. An SDAP layer entity of the terminal device maps a data packet of a QoS flow to a corresponding DRB based on a mapping relationship that is between a QFI and a DRB and that is configured by a base station, and then transmits uplink data on an air interface. For example, one QoS flow can be mapped only to one DRB, and different QoS flows may be mapped to a same DRB. A mapping relationship between a QoS flow and a DRB may be determined by the RAN device.

The packet filter sets in the QoS rule and the PDR are used to identify one or more data packet flows (for example, network protocol (IP) flows), and the packet filter sets may each include one or more packet filter templates. Currently, the 5GS defines two types of packet filter sets, namely, an IP packet filter set and an Ethernet packet filter set, based on a PDU session type. For an IP PDU session type, the packet filter set supports any combination of the following packet filter templates: a source/destination IP address or an IPv6 prefix, a source/destination port number, a protocol identifier of a protocol above an IP layer, a type of service (TOS) field of IPv4/a traffic class of IPv6 and a mask, an IPv6 flow label, a security parameter index, and a packet filter direction. A common packet filter template is a combination of the first three elements. To be specific, data packets are filtered based on 5-tuples (source/destination addresses, source/destination port numbers, and transport layer protocols) of the IP data packets. In embodiments of the present invention, an example in which the 5-tuple of the IP data packet is a packet filter template is used. In specific embodiments, any combination of the foregoing elements may be used as a packet filter template.

It can be learned from the foregoing descriptions that, when the QoS model shown in FIG. 3 is used, if different data packets have a same 5-tuple, the data packets are marked with a same QFI, and are mapped to a same QoS flow. Further, on a core network side, data packets marked with a same QFI are subject to same forwarding and scheduling treatment. On an air interface side, a DRB is a logical channel for data packet transmission. The RAN device may perform specific configuration on the DRB, to ensure a QoS requirement that a data packet processed and transmitted through the DRB can satisfy on the air interface side. Therefore, data packets transmitted through the DRB are subject to same treatment on the air interface side. In other words, data packets in one QoS flow are always subject to same treatment in the 5GS, for example, scheduling and forwarding priorities.

However, in some possible scenarios, for example, a social live video streaming (SLVS) transmission scenario and a transmission control protocol (TCP) data stream transmission scenario, data mapped to a same QoS flow may have different QoS requirements (for example, a delay requirement and a reliability requirement). Specifically, in the SLVS transmission scenario, an SLVS application may provide video streams/data streams for both real-time viewing and delayed viewing. In this case, in a transmission process of a same video stream/data stream, there are both a delay-sensitive video frame and a video frame that is not delay-sensitive but has a high reliability requirement. For the TCP data stream transmission scenario, in a TCP data stream, timely transmission of a TCP ACK frame can effectively control congestion (to be specific, a delay requirement of the TCP ACK frame is high). Therefore, data frames of different importance also exist in a same TCP data stream.

For the SLVS transmission scenario and the TCP data stream transmission scenario, because data packets of a same video stream/data stream have a same 5-tuple, these data packets correspond to a same QFI. Therefore, these data packets are mapped to a same QoS flow. A same QoS flow has a same QoS guarantee. To be specific, when a QoS parameter is set based on a delay requirement for the QoS flow that the video stream/data stream is mapped to, only a transmission delay requirement of the video stream/data stream can be met, and a transmission reliability requirement of the video stream/data stream cannot be met. When a QoS parameter is set based on a reliability requirement for the QoS flow that the video stream/data stream is mapped to, only a transmission reliability requirement of the video stream/data stream can be met, and a transmission delay requirement of the video stream/data stream cannot be met. When parameters are set based on a reliability requirement and a delay requirement for the QoS flow that the video stream/data stream is mapped to, a transmission reliability requirement and a delay requirement of the video stream/data stream can be met, and user experience is ensured, but a large quantity of resources are consumed. Based on this, embodiments of this application provide a data transmission method to implement distinguishing processing on data of a same video stream/data stream, so that resource utilization is improved while different transmission requirements are met.

For example, the data transmission method provided in embodiments of this application may include two possible solutions: Solution 1 and Solution 2. In Solution 1, a first communication apparatus determines, based on first indication information from a second communication apparatus, whether a first service of a terminal device is a service of a first type. If the first service is the service of the first type, the first communication apparatus obtains characteristic information of the first service, where the characteristic information includes a first mapping relationship between a characteristic parameter and a QoS parameter. The first communication apparatus determines a second mapping relationship between a packet filter set of a data packet of the first service and a QoS flow based on the first mapping relationship. Further, the first communication apparatus sends the second mapping relationship to a third communication apparatus and the terminal device. According to this solution, when receiving a downlink data packet of the first service, the third communication apparatus determines a QFI of the data packet based on a characteristic parameter of the downlink data packet and the second mapping relationship, and maps the data packet to a QoS flow corresponding to the QFI, so that an access network device sends the data packet to the terminal device through a DRB corresponding to the QoS flow. The first communication apparatus may be an SMF entity, the second communication apparatus may be an AMF entity, and the third communication apparatus may be a UPF entity.

In Solution 2, a first communication apparatus determines, based on first indication information from a second communication apparatus, whether a first service of a terminal device is a service of a first type. If the first service is the service of the first type, the first communication apparatus obtains characteristic information of the first service, where the characteristic information includes a first mapping relationship between a characteristic parameter and a QoS parameter. The first communication apparatus sends the first mapping relationship to an access network device. The access network device determines a third mapping relationship between a characteristic parameter, a QFI, and a DRB based on the first mapping relationship. When a downlink data packet arrives at the access network device, the access network device determines, based on a characteristic parameter of the downlink data packet, a QFI, and the third mapping relationship, a DRB corresponding to the downlink data packet. The first communication apparatus may be an SMF entity, the second communication apparatus may be an AMF entity, and the third communication apparatus may be a UPF entity.

The following describes solutions in embodiments of this application in detail with reference to Embodiment 1 and Embodiment 2.

Embodiment 1

Figure 4:
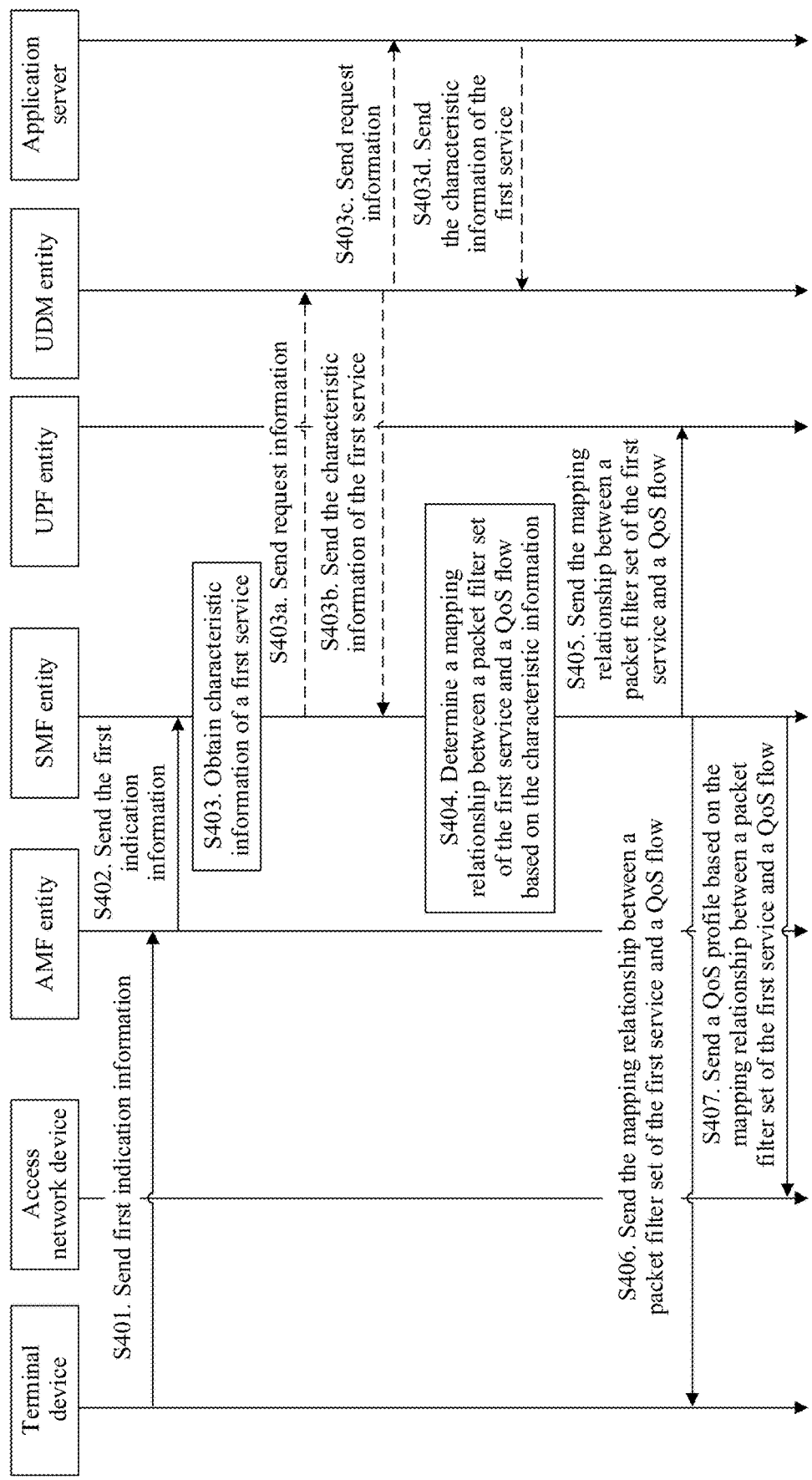
FIG. 4 and FIG. 5 are schematic flowcharts of data transmission methods according to embodiments of this disclosure.

FIG. 4 is a schematic flowchart of a data transmission method according to an embodiment of this disclosure. This embodiment relates to a specific process of data transmission between a terminal device, an access network device, and a core network device. The core network device includes a first communication apparatus, a second communication apparatus, a third communication apparatus, and a fourth communication apparatus. In this embodiment of this application, the first communication apparatus may be but is not limited to an SMF entity, the second communication apparatus may be but is not limited to an AMF entity, the third communication apparatus may be but is not limited to a UPF entity, and the fourth communication apparatus may be but is not limited to a UDM entity, a PCF entity, an NEF entity, a UDR entity, and an AF entity.

As shown in FIG. 4, the method may include S401 to S407. An execution sequence of S401 to S407 is not limited in this embodiment of this application.

S401. The terminal device sends first indication information to the second communication apparatus (where the following uses an example in which the second communication apparatus is an AMF entity for description). Correspondingly, the second communication apparatus (the AMF entity) receives the first indication information from the terminal device.

The terminal device may send the first indication information to the AMF entity in but not limited to any one of the following processes:

1. The terminal device sends a service request message to the AMF entity. The service request message is used by the terminal device to establish a secure connection to the AMF entity, or is used to activate a user plane connection for an established PDU session. The first indication information is carried in the service request message.

2. The terminal device sends a PDU session establishment request message to the AMF entity. The message is used to request to establish a PDU session, and the first indication information is carried in the PDU session establishment request message.

3. The terminal device sends a PDU session modification request message to the AMF entity. The message is used to request to modify a PDU session, and the first indication information is carried in the PDU session modification request message.

The first indication information indicates whether a first service of the terminal device is a service of a first type. In this embodiment of this application, the service of the first type means that data packets in data streams of the service may be distinguished into different data streams based on the foregoing packet filter template (such as a 5-tuple) and additional service-related characteristic information and/or a characteristic parameter. Different data streams have different quality of service requirements. In this embodiment of this application, the service of the first type may also be referred to as an enhanced QoS service.

A manner in which the first indication information indicates whether the first service of the terminal device is the service of the first type includes but is not limited to one or more of the following manners.

Manner 1

The first indication information may include one or more bits. When a value of the one or more bits is a first value, it indicates that the first service initiated by the terminal device is the service of the first type. When a value of the one or more bits is a second value, it indicates that the first service initiated by the terminal device is not the service of the first type. For example, the first indication information includes one bit. When a value of the bit is "0", it indicates that the first service initiated by the terminal device is the service of the first type, that is, the first value is "0". When a value of the bit is "1", it indicates that the first service initiated by the terminal device is not the service of the first type, that is, the second value is "1". Alternatively, when the value of the bit is "1", it indicates that the first service initiated by the terminal device is the service of the first type, that is, the first value is "1". When the value of the bit is "0", it indicates that the first service initiated by the terminal device is not the service of the first type, that is, the second value is "0".

Manner 2

The first indication information indicates whether the first service of the terminal device is the service of the first type by including or not including a specific identifier of the first service. Specifically, when the first indication information sent by the terminal device carries the specific identifier of the first service, it indicates that the first service initiated by the terminal device is the service of the first type. When the first indication information sent by the terminal device does not carry the specific identifier of the first service, it indicates that the first service initiated by the terminal device is not the service of the first type. The specific identifier of the first service may be preset in a protocol or pre-stored in the core network device. For example, the specific identifier of the first service may be represented by a first parameter, and the first parameter may be one or more bits.

S402. The second communication apparatus (the AMF entity) sends the first indication information to the first communication apparatus (where the following uses an example in which the first communication apparatus is an SMF entity for description). Correspondingly, the first communication apparatus (the SMF entity) receives the first indication information from the second communication apparatus (the AMF entity).

The AMF entity may send the first indication information to the SMF entity in but not limited to any one of the following processes.

1. After receiving the service request message from the terminal device, the AMF entity sends a PDU session update SM context request (Nsmf_PDU Session_Update SM Context Request) message to the SMF entity. The first indication information is carried in the request message.

2. After receiving the session establishment request message from the terminal device, the AMF entity sends a PDU session establishment SM context request (Nsmf_PDU Session_Create SM Context Request) message to the SMF entity. The first indication information is carried in the request message.

3. After receiving the session modification request message from the terminal device, the AMF entity sends a PDU session update SM context request (Nsmf_PDU Session_Update SM Context Request) message to the SMF entity. The first indication information is carried in the request message.

The first indication information indicates whether the first service of the terminal device is the service of the first type. For the manner in which the first indication information indicates whether the first service of the terminal device is the service of the first type, refer to S401. Details are not described herein again.

S403. The first communication apparatus (the SMF entity) obtains characteristic information of the first service based on the first indication information.

Specifically, the characteristic information includes a mapping relationship (which is referred to as a first mapping relationship in this embodiment of this application) between a characteristic parameter and a QoS parameter. The QoS parameter includes but is not limited to at least one of a reliability parameter, a delay parameter, a throughput parameter, a priority parameter, a delay variation parameter, a service time to live, and a packet loss rate parameter. In this embodiment of this application, the characteristic parameter may also be referred to as an enhanced QoS parameter, an enhanced QoS identifier parameter, an enhanced QoS indicator (eQI), or the like. This is not limited in this embodiment of this application. A form of the characteristic parameter may be but is not limited to one or more of the following.

Form 1: The characteristic parameter is a value of a specified location or a specified field that is in a protocol layer header of a data packet generated by the terminal device or a data packet received by a UPF from an external network. For example, the characteristic parameter may be a value of n bits starting from an $m^{th}$ byte in an application layer header of a data packet, where m and n are positive integers, for example, m=4 and n=2. For another example, the characteristic parameter may be a value of a $z^{th}$ field in a TCP layer header of a data packet, where z is a positive integer, for example, z=1.

Form 2: The characteristic parameter is a parameter used to reflect a characteristic of a data packet, for example, a size or a type of the data packet. In an optional manner, the characteristic parameter is a size of a data packet generated by the terminal device or a data packet received by a UPF from an external network. For example, a data packet size greater than 0 bytes and less than or equal to 100 bytes corresponds to a first characteristic parameter, and a data packet size greater than 100 bytes and less than or equal to 1000 bytes corresponds to a second characteristic parameter. In another optional manner, the characteristic parameter may be a type of a data packet generated by the terminal device or a data packet received by a UPF from an external network. Video data is used as an example. An I-frame data packet corresponds to a first characteristic parameter, and a B-frame data packet corresponds to a second characteristic parameter.

When the form of the characteristic parameter is the foregoing Form 1, an example of the characteristic information is shown in Table 1. When a value of the characteristic parameter is "0", it indicates that a corresponding reliability range is [90%, 95%]. When a value of the characteristic parameter is "1", it indicates that a corresponding reliability value range is [95%, 99%]. Another example of the characteristic information is shown in Table 2. When a value of the characteristic parameter is "0", it indicates that a corresponding reliability value range is [90%, 95%], and a delay value range is [5 ms, 10 ms]. When a value of the characteristic parameter is "1", it indicates that a corresponding reliability value range is [90%, 95%], and a delay value range is [0 ms, 5 ms]. When a value of the characteristic parameter is "2", it indicates that a corresponding reliability value range is [95%, 99%], and a delay value range is [5 ms, 10 ms]. When a value of the characteristic parameter is "3", it indicates that a corresponding reliability value range is (95%, 99%], and a delay value range is [0 ms, 5 ms]. In this embodiment of this application, that a value range of a variable x is [a, b] indicates that x is greater than or equal to a and less than or equal to b, that a value range of a variable x is [a, b] indicates that x is greater than a and less than or equal to b, and that a value range of a variable x is [a, b] indicates that x is greater than or equal to a and less than b, where a and b are real numbers.

TABLE 1

Example 1 of the characteristic information of the first service

| Characteristic parameter | Reliability range |
|---|---|
| 0 | [90%, 95%] |
| 1 | [95%, 99%] |

TABLE 2

Example 2 of the characteristic information of the first service

| Characteristic parameter | Reliability range | Delay range |
|---|---|---|
| 0 | [90%, 95%] | [5 ms, 10 ms] |
| 1 | [90%, 95%] | [0 ms, 5 ms] |
| 2 | [95%, 99%] | [5 ms, 10 ms] |
| 3 | [95%, 99%] | [0 ms, 5 ms] |

When the form of the characteristic parameter is the foregoing Form 2, an example of the characteristic information is shown in Table 3. When a data packet size corresponding to the characteristic parameter is 0 to 100 bytes, it indicates that a corresponding reliability value range is [95%, 99%], and a delay value range is [0 ms, 5 ms]. When a data packet size corresponding to the characteristic parameter is 100 to 1000 bytes, it indicates that a corresponding reliability value range is [90%, 95%], and a delay value range is [5 ms, 10 ms].

TABLE 3

Example 3 of the characteristic information of the first service

| Characteristic parameter | Reliability range | Delay range |
|---|---|---|
| [0, 100] bytes | [95%, 99%] | [0 ms, 5 ms] |
| [100, 1000] bytes | [90%, 95%] | [5 ms, 10 ms] |

That the first communication apparatus (the SMF entity) obtains characteristic information of the first service based on the first indication information specifically includes: when the first indication information indicates that a type of the first service of the terminal device is the first type, the SMF entity obtains the characteristic information of the first service.

Specifically, that the SMF entity obtains the characteristic information of the first service includes the following three cases.

Case 1: The SMF entity stores the characteristic information of the first service. When the first indication information indicates that the type of the first service is the first type, the SMF entity obtains the characteristic information of the first service stored in the SMF entity.

Case 2: The SMF entity does not store the characteristic information of the first service. When the first indication information indicates that the type of the first service is the first type, a method for the SMF entity to obtain the characteristic information of the first service based on the first indication information specifically includes S403a and S403b. When the first indication information indicates that the type of the first service is the first type, the SMF entity sends request information to the fourth communication apparatus (for example, a UDM entity), where the request information is used to request the characteristic information of the first service (S403a in FIG. 4). After receiving the request information from the SMF entity, the UDM entity sends the characteristic information of the first service to the SMF entity (S403b in FIG. 4). Optionally, the method for the SMF entity to obtain the characteristic information of the first service based on the first indication information may further include S403c and S403d. The SMF entity sends the request information to the UDM entity, where the request information is used to request the characteristic information of the first service (S403a in FIG. 4). When the UDM entity does not store the characteristic information of the first service, the UDM entity sends request information to an application server to request the characteristic information of the first service (S403c in FIG. 4). Correspondingly, when receiving the request information from the UDM entity, the application server sends the characteristic information of the first service to the UDM entity (S403d in FIG. 4). After receiving the characteristic information of the first service from the application server, the UDM entity sends the characteristic information of the first service to the SMF entity (S403b in FIG. 4).

Optionally, in Case 2, the fourth communication apparatus may alternatively be a PCF entity, an NEF entity, or a UDR entity. In other words, the SMF entity may send request information to the PCF entity, the NEF entity, or the UDR entity, to request the characteristic information of the first service. Optionally, the SMF entity may directly send request information to the application server, to request the characteristic information of the first service.

Case 3: The fourth communication apparatus sends the characteristic information of the first service to the SMF entity. Specifically, an AF entity or an application server indicates the characteristic information of the first service to the fourth communication apparatus. The fourth communication apparatus indicates a policy and charging control (policy and charging control, PCC) rule to the SMF entity. The PCC rule may include the characteristic information of the first service. After receiving the PCC rule, the SMF entity may obtain the characteristic information of the first service. In this case, the characteristic information of the first service is actively sent by the fourth communication apparatus to the SMF entity, and the fourth communication apparatus may be a PCF entity. Optionally, in the foregoing Case 3, the SMF entity may directly initiate a PDU session establishment procedure or a PDU session modification procedure. To be specific, the SMF entity sends a PDU session establishment request message or a PDU session modification request message to the access network device. In this case, S401 and S402 do not need to be performed.

S404. The first communication apparatus (the SMF entity) determines a mapping relationship (which is referred to as a second mapping relationship in Embodiment 1) between a packet filter set of the first service and a QoS flow based on the characteristic information of the first service.

Specifically, the packet filter set of the first service includes the characteristic parameter in the characteristic information, and a form of the second mapping relationship may be a mapping relationship between a packet filter set of the first service and a QFI corresponding to a QoS flow.

For example, when the characteristic information of the first service is as that shown in Table 1, the second mapping relationship determined by the SMF entity based on the characteristic information of the first service is shown in Table 4. When a 5-tuple of a data packet of the first service is equal to A and a characteristic parameter of the data packet of the first service is equal to M, the data packet is mapped to a QoS flow whose QFI is equal to 0. When a 5-tuple of a data packet of the first service is equal to A and a characteristic parameter of the data packet of the first service is equal to N, the data packet is mapped to a QoS flow whose QFI is equal to 1. When a 5-tuple of a data packet of the first service is equal to B and a characteristic parameter of the data packet of the first service is equal to M, the data packet is mapped to a QoS flow whose QFI is equal to 2. When a 5-tuple of a data packet of the first service is equal to B and a characteristic parameter of the data packet of the first service is equal to N, the data packet is mapped to a QoS flow whose QFI is equal to 3. An example of M and N may be M=0 and N=1. Optionally, a 5-tuple may be a source address, a destination address, a source port number, a destination port number, and a transport layer protocol identifier of a data packet. For example, A=[a1, a2, a3, a4, a5], where a1, a2, a3, a4, and a5 respectively correspond to a source address, a destination address, a source port number, a destination port number, and a transport layer protocol identifier of a data packet. Optionally, a1 may represent one value, may represent a plurality of values, or may represent a value range. a2, a3, a4, and a5 are similar to a1, and B is similar to A. Details are not described herein again. A person skilled in the art should understand that Table 4 is merely an example of the second mapping relationship, and a form of the second mapping relationship is not limited in this embodiment of this disclosure.

TABLE 4

Mapping relationship between a packet filter set and a QFI corresponding to a QoS flow (the second mapping relationship)

| Packet filter set | QFI |
|---|---|
| 5-tuple = A; characteristic parameter = M | 0 |
| 5-tuple = A; characteristic parameter = N | 1 |
| 5-tuple = B; characteristic parameter = M | 2 |
| 5-tuple = B; characteristic parameter = N | 3 |

S405. The first communication apparatus (the SMF entity) sends the mapping relationship (the second mapping relationship) between a packet filter set of the first service and a QoS flow to the third communication apparatus (a UPF entity). Correspondingly, the third communication apparatus (the UPF entity) receives, from the first communication apparatus (the SMF entity), the mapping relationship (the second mapping relationship) between a packet filter set of the first service and a QoS flow.

Specifically, the SMF entity sends a PDR to the UPF entity, and the PDR includes the mapping relationship. After receiving downlink data packets of the first service, the UPF entity maps the downlink data packets to different QoS flows based on the characteristic parameter and the 5-tuple that are in each of the downlink data packets and the mapping relationship. Optionally, the PDR may further include a parameter such as a priority value. A smaller parameter value indicates a higher priority. Optionally, the characteristic parameter of each of the downlink data packets is configured by the application server.

S406. The first communication apparatus (the SMF entity) sends the mapping relationship (the second mapping relationship) between a packet filter set of the first service and a QoS flow to the terminal device.

Specifically, the SMF entity sends a QoS rule to the terminal device, and the QoS rule includes the second mapping relationship. Optionally, the QoS rule may be carried in a PDU session establishment acknowledgment (PDU session establishment ack) message or a PDU session modification command/acknowledgment (PDU session modification command/ack) message. The terminal device maps uplink data packets of the first service to different QoS flows based on the second mapping relationship. Optionally, the QoS rule may further include parameters such as an identifier of the QoS rule and a priority value.

Optionally, the SMF entity may send the QoS rule to the terminal device through the AMF entity. Specifically, the SMF entity sends the QoS rule to the AMF entity, and the AMF entity forwards the QoS rule to the terminal device.

S407. The first communication apparatus (the SMF entity) sends a QoS profile (QoS profile) to the access network device based on the mapping relationship (the second mapping relationship) between a packet filter set of the first service and a QoS flow. Correspondingly, the access network device receives the QoS profile from the first communication apparatus (the SMF entity).

Specifically, the QoS profile includes a QFI value, a characteristic parameter value corresponding to the QFI value, and a quality of service parameter corresponding to the characteristic parameter value. For example, the mapping relationship between a packet filter set and a QFI in Table 4 is used as an example. A QoS profile corresponding to the QoS flow whose QFI is equal to 0 includes a characteristic parameter equal to M and a quality of service requirement corresponding to the characteristic parameter equal to M (to be specific, when M=0, in Table 1, a quality of service requirement corresponding to the characteristic parameter equal to 0 is that the reliability range is [90%, 95%]). A QoS profile corresponding to the QoS flow whose QFI is equal to 1 includes a characteristic parameter equal to N and a quality of service requirement corresponding to the characteristic parameter equal to 1 (to be specific, when N=1, in Table 1, a quality of service requirement corresponding to the characteristic parameter equal to 1 is that the reliability range is [95%, 99%]). Optionally, the QoS profile may further include a 5G quality of service identifier (5QI), and may further include other possible information. This is not specifically limited.

After receiving the QoS profile, the access network device determines, based on the received QoS profile, a characteristic parameter corresponding to each received QoS flow and a quality of service requirement corresponding to the characteristic parameter. For example, when a downlink data packet arrives at the UPF, if a characteristic parameter carried in a data packet header of the downlink data packet is 0, the UPF maps the data packet to a QoS flow whose QFI is equal to 0 based on a PDR indicated by the SMF. When another data packet arrives, if a data packet header of the data packet carries a characteristic parameter equal to 1, the UPF maps the data packet to a QoS flow whose QFI is equal to 2. The access network device determines, based on the received QoS profile, characteristic parameters corresponding to the QoS flow whose QFI is equal to 0 and the QoS flow whose QFI is equal to 1, and quality of service requirements corresponding to the characteristic parameters, to configure an appropriate air interface parameter for the terminal device, for example, configure an appropriate DRB, a logical channel associated with the DRB, and a priority of the logical channel.

The foregoing embodiment provides a data transmission method. The first communication apparatus determines, based on the first indication information, whether a data packet in a data stream of the first service of the terminal device needs to be distinguished at a finer granularity. When the data packet in the data stream of the first service needs to be distinguished at the finer granularity, the first communication apparatus obtains the characteristic information of the first service, and considers the characteristic information when generating the packet filter set. The first communication apparatus determines the second mapping relationship between a packet filter set of the first service and a QoS flow based on the first mapping relationship between a characteristic parameter and a QoS parameter in the characteristic information. In this way, a quality of service requirement of the data packet is more comprehensively considered, and distinguishing processing can be more effectively performed on data of the first service, so that resource utilization is improved while different transmission requirements are met.

Embodiment 2

Figure 5:
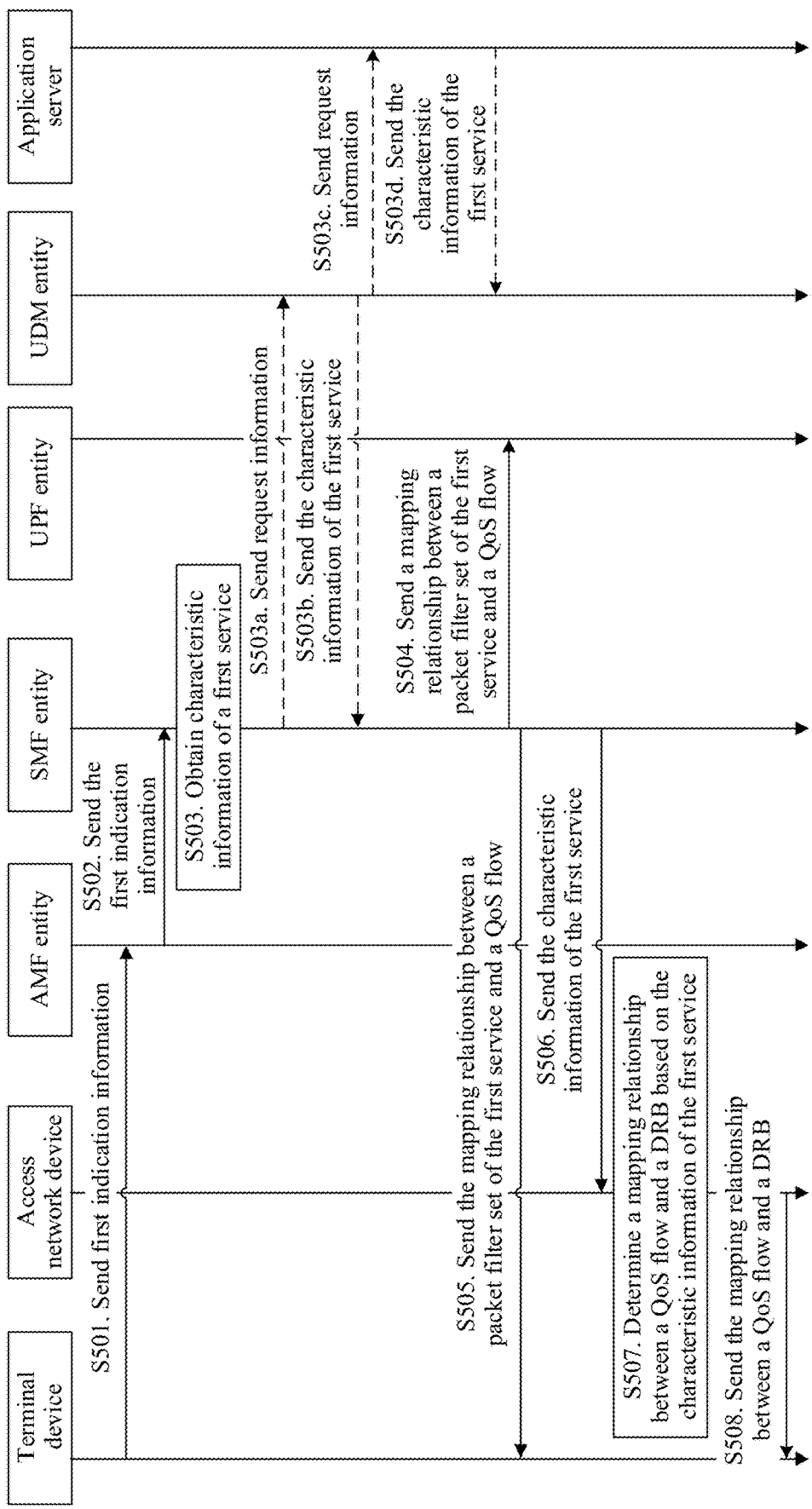

FIG. 5 is a schematic flowchart of a data transmission method according to an embodiment of this disclosure. This embodiment relates to a specific process of data transmission between a terminal device, an access network device, and a core network device. The core network device includes a first communication apparatus, a second communication apparatus, a third communication apparatus, and a fourth communication apparatus. In this embodiment of this application, the first communication apparatus may be but is not limited to an SMF entity, the second communication apparatus may be but is not limited to an AMF entity, the third communication apparatus may be but is not limited to a UPF entity, and the fourth communication apparatus may be but is not limited to a UDM entity, a PCF entity, an NEF entity, a UDR entity, and an AF entity.

As shown in FIG. 5, the method may include S501 to S508. An execution sequence of S501 to S508 is not limited in this embodiment of this application.

S501. The terminal device sends first indication information to the second communication apparatus (an AMF entity). Correspondingly, the second communication apparatus (the AMF entity) receives the first indication information from the terminal device. The first indication information indicates whether a first service of the terminal device is a service of a first type.

S502. The second communication apparatus (the AMF entity) sends the first indication information to the first communication apparatus (an SMF entity). Correspondingly, the first communication apparatus (the SMF entity) receives the first indication information from the second communication apparatus (the AMF entity).

S503. The first communication apparatus (the SMF entity) obtains characteristic information of the first service based on the first indication information.

For detailed descriptions of S501 to S503, refer to S401 to S403 in FIG. 4. Details are not described herein again.

S504. The first communication apparatus (the SMF entity) sends a mapping relationship between a packet filter set of the first service and a QoS flow to the third communication apparatus (a UPF entity). Correspondingly, the third communication apparatus (the UPF entity) receives, from the first communication apparatus (the SMF entity), the mapping relationship between a packet filter set of the first service and a QoS flow.

Specifically, the SMF entity sends a PDR to the UPF entity, and the PDR includes the mapping relationship between a packet filter set of the first service and a QoS flow. Optionally, the PDR may further include a parameter such as a priority value.

A form of the mapping relationship between a packet filter set of the first service and a QoS flow may be a mapping relationship between a packet filter set of the first service and a QFI. It should be noted that the packet filter set of the first service in S504 is different from the packet filter set of the first service in S404, and the packet filter set of the first service in S504 does not include a characteristic parameter in the characteristic information of the first service.

For example, as shown in Table 5, when a 5-tuple of a data packet is equal to A, the data packet belongs to a QoS flow whose QFI is equal to 0, or when a 5-tuple of a data packet is equal to B, the data packet belongs to a QoS flow whose QFI is equal to 1. A person skilled in the art should understand that Table 5 is merely an example of the mapping relationship, and a form of the mapping relationship is not limited in this embodiment of this application.

TABLE 5

| Mapping relationship between a packet filter set and a QFI | |
| --- | --- |
| Packet filter set | QFI |
| 5-tuple = A | 0 |
| 5-tuple = B | 1 |

When a downlink data packet of the first service arrives at the UPF entity, a header of the downlink data packet of the first service received by the UPF entity carries a characteristic parameter. The UPF entity encapsulates the downlink data packet into a GTP-U data packet, and adds the characteristic parameter to the GTP-U data packet. For example, a field may be added to a GTP-U header to indicate the characteristic parameter, or a reserved bit in the GTP-U header may be used to indicate the characteristic parameter.

The UPF entity sends, to the access network device, the GTP-U data packet to which the characteristic parameter is added. Specifically, the UPF entity determines a QoS flow corresponding to the downlink data packet based on 5-tuple information of the received downlink data packet and the mapping relationship between a packet filter set of the first service and a QoS flow. Table 5 is used as an example. When the 5-tuple information of the downlink data packet is equal to A, the UPF entity encapsulates the downlink data packet into the GTP-U data packet, adds the characteristic parameter to the GTP-U data packet, maps the GTP-U data packet to which the characteristic parameter is added to the QoS flow whose QFI is equal to 0, and sends the data packet to the access network device.

S505. The first communication apparatus (the SMF entity) sends the mapping relationship between a packet filter set of the first service and a QoS flow to the terminal device. Correspondingly, the terminal device receives, from the first communication apparatus (the SMF entity), the mapping relationship between a packet filter set of the first service and a QoS flow.

Specifically, the SMF entity sends a QoS rule to the terminal device, and the QoS rule includes the mapping relationship between a packet filter set of the first service and a QoS flow. Optionally, the QoS rule may be carried in a PDU session establishment acknowledgment (PDU session establishment ack) message or a PDU session modification command/acknowledgment (PDU session modification command/ack) message. Optionally, the QoS rule may further include parameters such as an identifier of the QoS rule and a priority value.

Optionally, the SMF entity may send the QoS rule to the terminal device through the AMF entity. Specifically, the SMF entity sends the QoS rule to the AMF entity, and the AMF entity forwards the QoS rule to the terminal device.

The terminal device receives the QoS rule, and maps uplink data packets of the first service to different QoS flows based on the mapping relationship that is between a packet filter set of the first service and a QoS flow and that is in the QoS rule.

S506. The first communication apparatus (the SMF entity) sends the characteristic information of the first service to the access network device. Correspondingly, the access network device receives the characteristic information of the first service from the first communication apparatus (the SMF entity).

Specifically, the SMF entity sends a QoS profile to the access network device, where the QoS profile includes the characteristic information of the first service. Examples of the characteristic information of the first service are shown in Table 1 and Table 2 in Embodiment 1.

S507. The access network device determines a mapping relationship (which is referred to as a third mapping relationship below) between a QoS flow, a characteristic parameter, and a DRB based on the characteristic information of the first service.

Specifically, a form of the third mapping relationship may be a mapping relationship between a QFI of a QoS flow, a characteristic parameter, and a DRB. For example, when the characteristic information of the first service received by the access network device is that shown in Table 2, the access network device determines the mapping relationship between a QFI, a characteristic parameter, and a DRB based on Table 2. The mapping relationship is shown in Table 6.

It can be learned from Table 6 that data packets that are in QoS flows with a same QFI and that correspond to different characteristic parameters may be mapped to a same DRB or different DRBs. For example, in a QoS flow whose QFI is 1, data packets whose corresponding characteristic parameters are 0 and 1 are mapped to a DRB 0, and data packets whose corresponding characteristic parameters are 2 and 3 are mapped to a DRB 1.

TABLE 6

Mapping relationship between a QFI, a characteristic parameter, and a DRB (the third mapping relationship)

| QFI | Characteristic parameter | DRB ID |
|---|---|---|
| 1 | 0 and 1 | 0 |
| 1 | 2 and 3 | 1 |
| 2 | 0 and 1 | 2 |
| 2 | 2 and 3 | 3 |

When the downlink data packet of the first service arrives at the UPF entity, the UPF entity determines, based on the 5-tuple information of the downlink data packet and the mapping relationship in S504, the QoS flow corresponding to the data packet. The UPF entity encapsulates the downlink data packet into the GTP-U data packet, and adds the characteristic parameter to the GTP-U data packet. Correspondingly, after receiving the GTP-U data packet, the access network device determines, based on a QFI of the data packet, the characteristic parameter, and the third mapping relationship, a DRB to which the downlink data packet is mapped.

S508: The access network device sends the third mapping relationship determined in S507 to the terminal device. Correspondingly, the terminal device receives the third mapping relationship from the access network device. Specifically, the access network device sends an RRC reconfiguration message to the terminal device, where the RRC reconfiguration message includes the third mapping relationship.

When the terminal device sends uplink data packets, after generating the uplink data packets, an application layer of the terminal device distinguishes the uplink data packets into different QoS flows based on the packet filter set in the QoS rule configured by the SMF entity in S505. The application layer or a non-access stratum (NAS) of the terminal device further adds a characteristic parameter to the uplink data packet. An SDAP layer entity of the terminal device maps the data packet to a corresponding DRB based on the characteristic parameter of the uplink data packet and the third mapping relationship between a QFI, a characteristic parameter and a DRB, and then transmits uplink data on an air interface.

The foregoing embodiment provides a data transmission method. The first communication apparatus determines, based on the first indication information, whether a data packet in a data stream of the first service of the terminal device needs to be distinguished at a finer granularity. When the data packet in the data stream of the first service needs to be distinguished at the finer granularity, the first communication apparatus obtains the characteristic information of the first service, and sends the characteristic information to the access network device. The access network device determines the third mapping relationship between a characteristic parameter, a QFI, and a DRB based on a first mapping relationship between a characteristic parameter and a QoS parameter in the characteristic information, so that data packets with a same QFI can be mapped to different DRBs. In this manner, distinguishing processing can be performed on data more effectively, so that resource utilization is improved while different transmission requirements are met. In addition, according to the method described in Embodiment 2, when the core network device transmits the data stream of the first service to the access network device, the core network device does not distinguish between data packets, the access network device performs distinguishing processing on the data packets instead when sending the data packets to the terminal device through an air interface, so that complexity of the core network device can be reduced.

It should be noted that in specific implementation, some steps in FIG. 4 and FIG. 5 may be selected for implementation, or a sequence of the steps in the figure may be adjusted for implementation. This is not limited in this application. It should be understood that performing some steps in the figure or adjusting a sequence of the steps for specific implementation falls within the protection scope of this application.

It may be understood that, to implement the functions in the foregoing embodiments, the network device and the terminal device include corresponding hardware structures and/or software modules for performing the functions. A person skilled in the art should easily be aware that, in combination with the units and the method steps in the examples described in embodiments disclosed in this application, this application can be implemented by hardware, software, or a combination of hardware and software. Whether a function is performed by hardware, software, or hardware driven by computer software depends on particular application scenarios and design constraints of the technical solutions.

Figure 6:
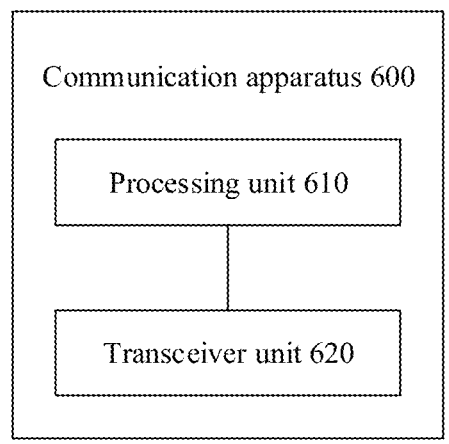
FIG. 6 and FIG. 7 are schematic diagrams of structures of possible communication apparatuses according to embodiments of this disclosure.
Figure 7:
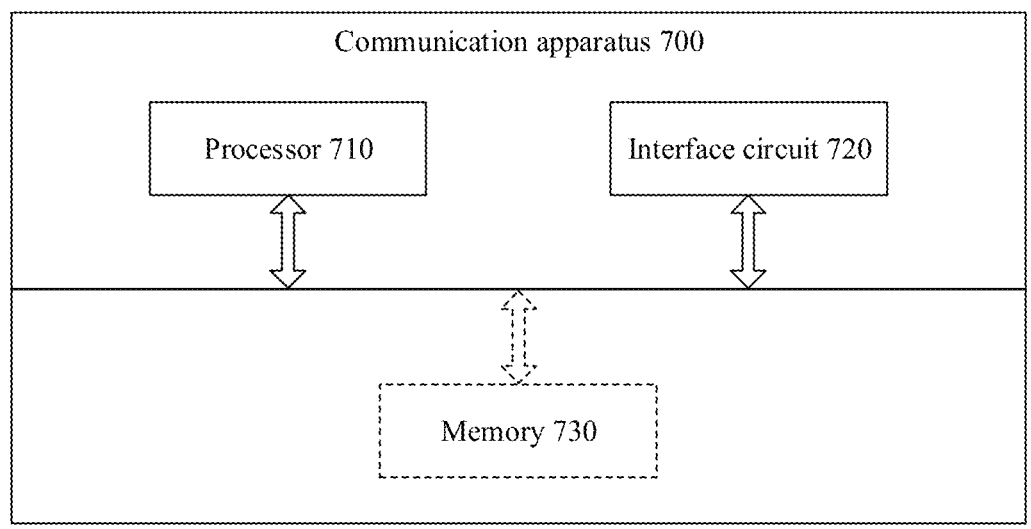

FIG. 6 and FIG. 7 are schematic diagrams of structures of possible communication apparatuses according to embodiments of this application. These communication apparatuses may be configured to implement functions of the first communication apparatus or the access network device in the foregoing method embodiments.

As shown in FIG. 6, a communication apparatus 600 includes a processing unit 610 and a transceiver unit 620. The communication apparatus 600 is configured to implement the functions of the first communication apparatus in the method embodiments shown in FIG. 4 and FIG. 5.

When the communication apparatus 600 is configured to implement functions of the first communication apparatus in the method embodiment shown in FIG. 4, the transceiver unit 620 is configured to receive first indication information from a second communication apparatus, where the first indication information indicates whether a first service of a terminal device is a service of a first type. The processing unit 610 is configured to obtain characteristic information of the first service based on the first indication information, and the processing unit 610 is further configured to determine a mapping relationship between a packet filter set of the first service and a quality of service QoS flow based on the characteristic information. The transceiver unit 620 is further configured to send the mapping relationship between a packet filter set of the first service and a QoS flow to a third communication apparatus.

When the communication apparatus 600 is configured to implement functions of the first communication apparatus in the method embodiment shown in FIG. 5, the transceiver unit 620 is configured to receive first indication information from a second communication apparatus, where the first indication information indicates whether a first service of a terminal device is a service of a first type. The processing unit 610 is configured to obtain characteristic information of the first service based on the first indication information. The transceiver unit 620 is further configured to send the characteristic information of the first service to an access network device.

When the communication apparatus 600 is configured to implement functions of the access network device in the method embodiment shown in FIG. 5, the transceiver unit 620 is configured to receive characteristic information of a first service from a first communication apparatus. The processing unit 610 is configured to determine a mapping relationship between a QoS flow, a characteristic parameter, and a DRB based on the characteristic information of the first service.

For more detailed descriptions of the processing unit 610 and the transceiver unit 620, directly refer to related descriptions in the method embodiments shown in FIG. 4 and FIG. 5. Details are not described herein.

As shown in FIG. 7, a communication apparatus 700 includes a processor 710 and an interface circuit 720. The processor 710 and the interface circuit 720 are coupled to each other. It may be understood that the interface circuit 720 may be a transceiver or an input/output interface. Optionally, the communication apparatus 700 may further include a memory 730, configured to store instructions executed by the processor 710, input data required by the processor 710 to run the instructions, or data generated after the processor 710 runs the instructions.

When the communication apparatus 700 is configured to implement the methods shown in FIG. 2 to FIG. 5, the processor 710 is configured to implement functions of the processing unit 610, and the interface circuit 720 is configured to implement functions of the transceiver unit 620.

When the communication apparatus is a chip applied to a terminal device, the chip in the terminal device implements functions of the terminal device in the foregoing method embodiments. The chip in the terminal device receives information from another module (for example, a radio frequency module or an antenna) in the terminal device, where the information is sent by a network device to the terminal device. Alternatively, the chip in the terminal device sends information to another module (for example, a radio frequency module or an antenna) in the terminal device, where the information is sent by the terminal device to a network device.

When the communication apparatus is a chip applied to a network device, the chip in the network device implements functions of the network device in the foregoing method embodiments. The chip in the network device receives information from another module (for example, a radio frequency module or an antenna) in the network device, where the information is sent by a terminal device to the network device. Alternatively, the chip in the network device sends information to another module (for example, a radio frequency module or an antenna) in the network device, where the information is sent by the network device to a terminal device.

It may be understood that the processor in this embodiment of this application may be a central processing unit (CPU), may be another general-purpose processor, a digital signal processor (DSP), an application-specific integrated circuit (ASIC), a field programmable gate array (FPGA), another programmable logic device, a transistor logic device, a hardware component, or any combination thereof. The general-purpose processor may be a microprocessor, or may be any regular processor.

In this embodiment of this application, the processor may be a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or a storage medium in any other form well-known in the art. For example, a storage medium is coupled to the processor, so that the processor can read information from the storage medium and write information into the storage medium. Certainly, the storage medium may be a component of the processor. The processor and the storage medium may be disposed in an ASIC. In addition, the ASIC may be located in a network device or a terminal device. Certainly, the processor and the storage medium may alternatively exist in the network device or the terminal device as discrete components.

All or a part of the foregoing embodiments may be implemented by software, hardware, firmware, or any combination thereof. When software is used to implement the foregoing embodiments, all or a part of the foregoing embodiments may be implemented in a form of a computer program product. The computer program product includes one or more computer programs or instructions. When the computer programs or the instructions are loaded and executed on a computer, the procedures or the functions according to embodiments of this application are all or partially implemented. The computer may be a general-purpose computer, a dedicated computer, a computer network, a network device, a terminal device, or another programmable apparatus. The computer programs or the instructions may be stored in a computer-readable storage medium, or may be transmitted by using a computer-readable storage medium. The computer-readable storage medium may be any usable medium accessible by the computer, or a data storage device such as a server integrating one or more usable media. The usable medium may be a magnetic medium, for example, a floppy disk, a hard disk drive, or a magnetic tape; or may be an optical medium, for example, a DVD; or may be a semiconductor medium, for example, a solid state disk (SSD).

Unless otherwise stated or there is a logic conflict, terms and/or descriptions between different embodiments are consistent and may be mutually referenced, and technical features in different embodiments may be combined based on an internal logical relationship thereof, to form a new embodiment.

It may be understood that various numbers in embodiments are merely used for differentiation for ease of description, and are not used to limit the scope of embodiments of this disclosure. The sequence numbers of the foregoing processes do not mean execution sequences, and the execution sequences of the processes should be determined based on functions and internal logic of the processes.

What is claimed is:

1. A communication method performed by a first communication apparatus for distinguishing processing of data of at least one of a video stream or a data stream, the method comprising: receiving first indication information from a second communication apparatus, the first indication information indicating whether a first service of a terminal device is a service of a first type; obtaining characteristic information of the first service based on the first indication information, wherein the characteristic information of the first service includes a first mapping relationship between a characteristic parameter and a quality of service (QOS) parameter comprising at least one of a reliability parameter, a delay parameter, a throughput parameter, a priority parameter, a delay variation parameter, a service time to live, and a packet loss rate parameter; determining a second mapping relationship between a packet filter set of the first service and a quality of service (QOS) flow based on the characteristic information of the first service, wherein the packet filter set includes the characteristic parameter and the second mapping relationship between the packet filter set and the second QoS flow comprises a mapping relationship between the characteristic parameter and a quality of service flow identifier (QFI); and sending the second mapping relationship between the packet filter set of the first service and the Qos flow to a third communication apparatus, the third communication apparatus applying the second mapping relationship to map received downlink data packets of the first service to different QoS flows or to map uplink data packets of the first service to different QoS flows; wherein a value of the characteristic parameter indicates a corresponding reliability value range of the first service or a corresponding reliability value range and delay value range of the first service.

2. The method according to claim 1, the obtaining characteristic information of the first service based on the first indication information comprising:
when the first indication information indicates that the first service is the service of the first type, obtaining the characteristic information of the first service.

3. The method according to claim 1, the obtaining characteristic information of the first service comprising:
sending request information to a fourth communication apparatus to obtain the characteristic information of the first service; and
receiving second indication information from the fourth communication apparatus, the second indication information comprising the characteristic information of the first service.

4. The method according to claim 1, further comprising:
sending the mapping relationship between a packet filter set of the first service and a QoS flow to the terminal device.

5. The method according to claim 1, further comprising:
sending a QoS profile to an access network device based on the mapping relationship between a packet filter set of the first service and a QoS flow, the QoS profile comprising a mapping relationship between a characteristic parameter, a QFI, and a QoS parameter.

6. A communication apparatus, comprising: one or more processors; and a memory having instructions stored thereon that, when executed by the one or more processors, cause the apparatus to distinguish processing of data of at least one of a video stream or a data stream by: receiving first indication information from a second communication apparatus, the first indication information indicating whether a first service of a terminal device is a service of a first type; obtaining characteristic information of the first service based on the first indication information, wherein the characteristic information of the first service includes a first mapping relationship between a characteristic parameter and a quality of service (QOS) parameter comprising at least one of a reliability parameter, a delay parameter, a throughput parameter, a priority parameter, a delay variation parameter, a service time to live, and a packet loss rate parameter;- determining a second mapping relationship between a packet filter set of the first service and a quality of service (QOS) flow based on the characteristic information of the first service, wherein the packet filter set includes the characteristic parameter and the second mapping relationship between the packet filter set and the second QoS flow comprises a mapping relationship between the characteristic parameter and a quality of service flow identifier (QFI); and sending the second mapping relationship between the packet filter set of the first service and the Qos flow to a third communication apparatus, the third communication apparatus applying the second mapping relationship to map received downlink data packets of the first service to different QoS flows or to map uplink data packets of the first service to different QoS flows; wherein a value of the characteristic parameter indicates a corresponding reliability value range of the first service or a corresponding reliability value range and delay value range of the first service.

7. The apparatus according to claim 6, the obtaining of characteristic information of the first service based on the first indication information comprising:

when the first indication information indicates that the first service is the service of the first type, the apparatus obtains the characteristic information of the first service.

8. The apparatus according to claim 6, the obtaining the characteristic information of the first service comprising:
sending request information to a fourth communication apparatus to request the characteristic information of the first service; and
receiving second indication information from the fourth communication apparatus, the second indication information comprising the characteristic information of the first service.

9. The apparatus according to claim 6, further comprising:
sending the mapping relationship between a packet filter set of the first service and a QoS flow to the terminal device.

10. The apparatus according to claim 6, further comprising:
sending a QoS profile to an access network device based on the mapping relationship between a packet filter set of the first service and a QoS flow, the QoS profile comprising a mapping relationship between a characteristic parameter, a QFI, and a QoS parameter.

11. A non-transitory computer readable medium storing instructions that, when executed, cause a first communications apparatus to distinguish processing of data of at least one of a video stream or a data stream by: receiving first indication information from a second communication apparatus, the first indication information indicating whether a first service of a terminal device is a service of a first type; obtaining characteristic information of the first service based on the first indication information, wherein the characteristic information of the first service includes a first mapping relationship between a characteristic parameter and a Quality of service (Qos) parameter comprising at least one of a reliability parameter, a delay parameter, a throughput parameter, a priority parameter, a delay variation parameter, a service time to live, and a packet loss rate parameter; determining a second mapping relationship between a packet filter set of the first service and a quality of service (QOS) flow based on the characteristic information of the first service, wherein the packet filter set includes the characteristic parameter and the second mapping relationship between the packet filter set and the second QoS flow comprises a mapping relationship between the characteristic parameter and a Quality of service flow identifier (QFI); and send the second mapping relationship between the packet filter set of the first service and the QoS flow to a third communication apparatus.

12. The non-transitory computer readable medium according to claim 11, the obtaining characteristic information of the first service comprising:
sending request information to a fourth communication apparatus to obtain the characteristic information of the first service; and
receiving second indication information from the fourth communication apparatus, the second indication information comprising the characteristic information of the first service.

13. The non-transitory computer readable medium according to claim 11, the instructions further causing the communications apparatus to:
send the mapping relationship between a packet filter set of the first service and a Qos flow to the terminal device.

14. The non-transitory computer readable medium according to claim 11, the instructions further causing the communications apparatus to:
send a QoS profile to an access network device based on the mapping relationship between a packet filter set of the first service and a QoS flow, the QoS profile comprising a mapping relationship between a characteristic parameter, a QFI, and a QoS parameter.

15. The method according to claim 1, wherein the first communication apparatus is a session management function (SMF) entity, the second communication apparatus is an access and mobility management function (AMF) entity, and the third communication apparatus is a user plan function (UPF) entity.

16. The apparatus according to claim 6, wherein the first communication apparatus is a session management function (SMF) entity, the second communication apparatus is an access and mobility management function (AMF) entity, and the third communication apparatus is a user plan function (UPF) entity.

17. The non-transitory computer readable medium according to claim 11, wherein the first communication apparatus is a session management function (SMF) entity, the second communication apparatus is an access and mobility management function (AMF) entity, and the third communication apparatus is a user plan function (UPF) entity.

* * * * *